United States Patent [19]

Taylor

[11] 3,911,261

[45] Oct. 7, 1975

[54] PARITY PREDICTION AND CHECKING NETWORK

[75] Inventor: Jordan M. Taylor, Poughkeepsie, N.Y.

[73] Assignee: International Business Machines Corporation, Armonk, N.Y.

[22] Filed: Sept. 9, 1974

[21] Appl. No.: 504,605

[52] U.S. Cl. ........................ 235/153 AP; 235/92 EC

[51] Int. Cl.[2] ........................................ G06F 11/10

[58] Field of Search ... 235/153 AP, 153 AS, 92 EC; 340/146.1 AG

[56] References Cited

UNITED STATES PATENTS

| | | | |
|---|---|---|---|
| 3,141,962 | 7/1964 | Sakalay | 235/153 BB |
| 3,555,255 | 1/1971 | Toy | 235/153 BB |
| 3,649,817 | 3/1972 | Keller et al. | 235/153 BB |
| 3,699,322 | 10/1972 | Dorr | 235/153 AP |
| 3,732,407 | 5/1973 | Brewster et al. | 235/153 BB |
| 3,805,040 | 4/1974 | Boden | 235/153 AP |

*Primary Examiner*—Charles E. Atkinson
*Attorney, Agent, or Firm*—Jack M. Arnold

[57] ABSTRACT

A parity prediction and checking network for an N stage instruction counter or register. The parity is predicted and checked for less than 100% of the cycle time, with the actual percentage being determined by the number of stages of the counter which are sampled. A given one of said N stages, for example the first, through a Kth stage, where K is less than N, of the counter are sampled, prior to a ONE being applied to the given one of said N stages of the counter, for providing a check parity signal indicative of the time period during the counter cycle when parity is to be checked. The given one of the N stages through the Kth-1 stage of the counter are sampled, prior to the ONE being added, for providing a prediction signal indicative of whether or not parity should be changed. A predicted parity signal is stored in response to comparing the prediction signal with the parity signal provided by the existing parity generating circuit, prior to the ONE being added. The parity signal provided by the existing parity generating circuit, after the ONE is added, is compared with the stored predicted parity signal for providing an error signal whenever there is a lack of comparison of the two signals. An indication of error in parity is manifested whenever the error signal is provided during the time the check parity signal is stored.

9 Claims, 4 Drawing Figures

FIG. 2

| ROW | STAGES | $1-(1-P)^K$ | % PREDICT |
|---|---|---|---|
| 3A | 1 | $1-(1-.5)^1$ | .50 |
| 3B | 2 | $1-(1-.5)^2$ | .750 |
| 3C | 3 | $1-(1-.5)^3$ | .875 |
| 3D | 4 | $1-(1-.5)^4$ | .9375 |
| 3E | 5 | $1-(1-.5)^5$ | .96875 |
| 3F | 6 | $1-(1-.5)^6$ | .984375 |
| 3G | 7 | $1-(1-.5)^7$ | .9921875 |

FIG. 3

| ROW | BISTABLE STAGES | | | | | PARITY | | PREDICT GATE | CHANGE PARITY |
|---|---|---|---|---|---|---|---|---|---|
| | FF16 | FF4 | FF3 | FF2 | FF1 | 1's IN HIGH ORDER EVEN | 1's IN HIGH ORDER ODD | | |
| 2A | | 0 | 0 | 0 | 0 | 1 | 0 | A1 | YES |
| 2B | | 0 | 0 | 0 | 1 | 0 | 1 | A2 | NO |
| 2C | | 0 | 0 | 1 | 0 | 0 | 1 | A1 | YES |
| 2D | | 0 | 0 | 1 | 1 | 1 | 0 | A3 | YES |
| 2E | | 0 | 1 | 0 | 0 | 0 | 1 | A1 | YES |
| 2F | | 0 | 1 | 0 | 1 | 1 | 0 | A2 | NO |
| 2G | | 0 | 1 | 1 | 0 | 1 | 0 | A1 | YES |
| 2H | | 0 | 1 | 1 | 1 | 0 | 1 | A4 | NO |
| 2I | | 1 | 0 | 0 | 0 | 0 | 1 | A1 | YES |
| 2J | | 1 | 0 | 0 | 1 | 1 | 0 | A2 | NO |
| 2K | | 1 | 0 | 1 | 0 | 1 | 0 | A1 | YES |
| 2L | | 1 | 0 | 1 | 1 | 0 | 1 | A3 | YES |
| 2M | | 1 | 1 | 0 | 0 | 1 | 0 | A1 | YES |
| 2N | | 1 | 1 | 0 | 1 | 0 | 1 | A2 | NO |
| 2P | | 1 | 1 | 1 | 0 | 0 | 1 | A1 | YES |
| 2R | | 1 | 1 | 1 | 1 | 1 | 0 | NONE | — |

FIG. 4

PARITY PREDICT AND CHECK TRUTH TABLE

| ROW | 1A | 1B | 1C | 1D | 1E | 1F | 1G | 1H |
|---|---|---|---|---|---|---|---|---|
| 4A | 0 | 1 | 1 | 1 | 1 | 0 | 1 | 0 |
| 4B | 0 | 0 | 0 | 0 | 0 | 0 | 1 | 0 |
| 4C | 1 | 1 | 0 | 0 | 1 | 1 | 1 | 1 |
| 4D | 1 | 0 | 1 | 1 | 0 | 1 | 0 | 0 |

PARITY PREDICTION AND CHECKING NETWORK

BACKGROUND OF THE INVENTION

In the data processing and related art, it is well known that a multi-digit unit of data may be represented by signals, in that the number of signals present may be checked by means of a redundant, non-data bit. In this manner, a signal may be present on a non-data line if a number of signals representative of the multi-digit data is an even number, and no signal will be present when the number of data signals is an odd number. Alternatively, the presence of the redundant signal can indicate an odd number of data signals, etc. Persons skilled in the data processing art have come to call this redundant signal the "parity bit." Similarly, the signals indicative of the various digits in a multi-digit unit of data have become known as the "data bit." Thus, a complete unit of data, in preferred data processing apparatus, comprises a plurality of data bits and a parity bit. Each bit is a ONE if the corresponding signal is present and, conversely, each bit is a ZERO if the signal corresponding therewith is absent. Thus, a multi-digit unit of data comprising a plurality of ONES and ZEROS will be correspondingly represented by the presence or absence of signals on a plurality of lines, or in a plurality of bistable devices, or as inputs to amplifiers, etc. The parity bit will be a ONE if the total number of data bits is even and will be a ZERO if the total number of data bits is odd, or vice versa.

Data processing requirements frequently demand that units of data may be incremented or decremented, and this is often performed by means of addition in an adder, or the application of a pulse to a counter causing the counter to count up or down. In this way, signals indicative of data bits are combined with other signals so as to perform an addition or count function upon the data. In prior art devices, it has been found necessary to generate a new parity bit in response to the output of the device, and to predict what the parity ought to be at the same time that the device is determining what the new value of the data is. The predicted parity is compared with the parity generated after the bit is added to determine if there were any errors that occurred in the process of updating the device.

Parity predictors and checkers known in the prior art generally sample all stages of the device in order to predict the parity. This utilizes a great deal of physical space in the computer, as well as increasing the cost of the computer. One such parity predicting circuit is disclosed in U.S. Pat. No. 3,141,962 of Fred E. Sakalay, which patent is assigned to the assignee of the present invention. In Sakalay, as the number of stages increases the number of parity gates increases accordingly. It is seen, therefore that if the stages are 16, 32, 64, 128 or more, for a given adder or counter circuit, the parity predict circuit becomes increasingly larger, thus utilizing more computer space as well as increasing the computer cost.

According to the present invention, a parity prediction and checking network, which predicts and checks for less than 100% of the device cycle time, is disclosed which utilizes less space and may be implemented at a lower cost than similar networks known in the prior art, since only K stages of an N stage device, where K < N, are sampled to predict parity. This is so irrespective of the number of stages (N) in a given device. It is seen, therefore, that the larger N becomes, the greater is the space and cost savings realizable, when practising the present invention.

SUMMARY OF THE INVENTION

A parity checking circuit includes an N stage register the parity of which is checked by a parity generation circuit which is responsive to the binary stage of the register for providing a parity signal. Also included is means for storing a check parity signal indicative of the time period within which the parity of the register may be checked, prior to a ONE being applied to a given one of the N stages of the register, in response to sampling the given one of the N stages through a Kth stage of the register, where K is less than N. Further included is means for providing a predicted parity signal, prior to said ONE being applied to said given one of the N stages, in response to sampling at least certain ones of the given one of the N stages through the Kth stage. Finally, there is means for comparing the parity and the predicted parity signal, including means for indicating an error in parity whenever there is a lack of comparison during the time the check parity signal is stored.

BRIEF DESCRIPTION OF THE DRAWINGS

FIG. 2 is a table setting forth calculations indicative of the percent parity prediction time relative to the counter cycle time based on the number of stages of the counter which are sampled;

FIG. 3 is a truth table which illustrates the logic for predicting parity, and which predict gates are used in the generation of the predicted parity signal;

FIG. 4 is a truth table which is helpful in the understanding of the operation of the network illustrated in FIG. 1.

DETAILED DESCRIPTION OF THE INVENTION

Figure 1:
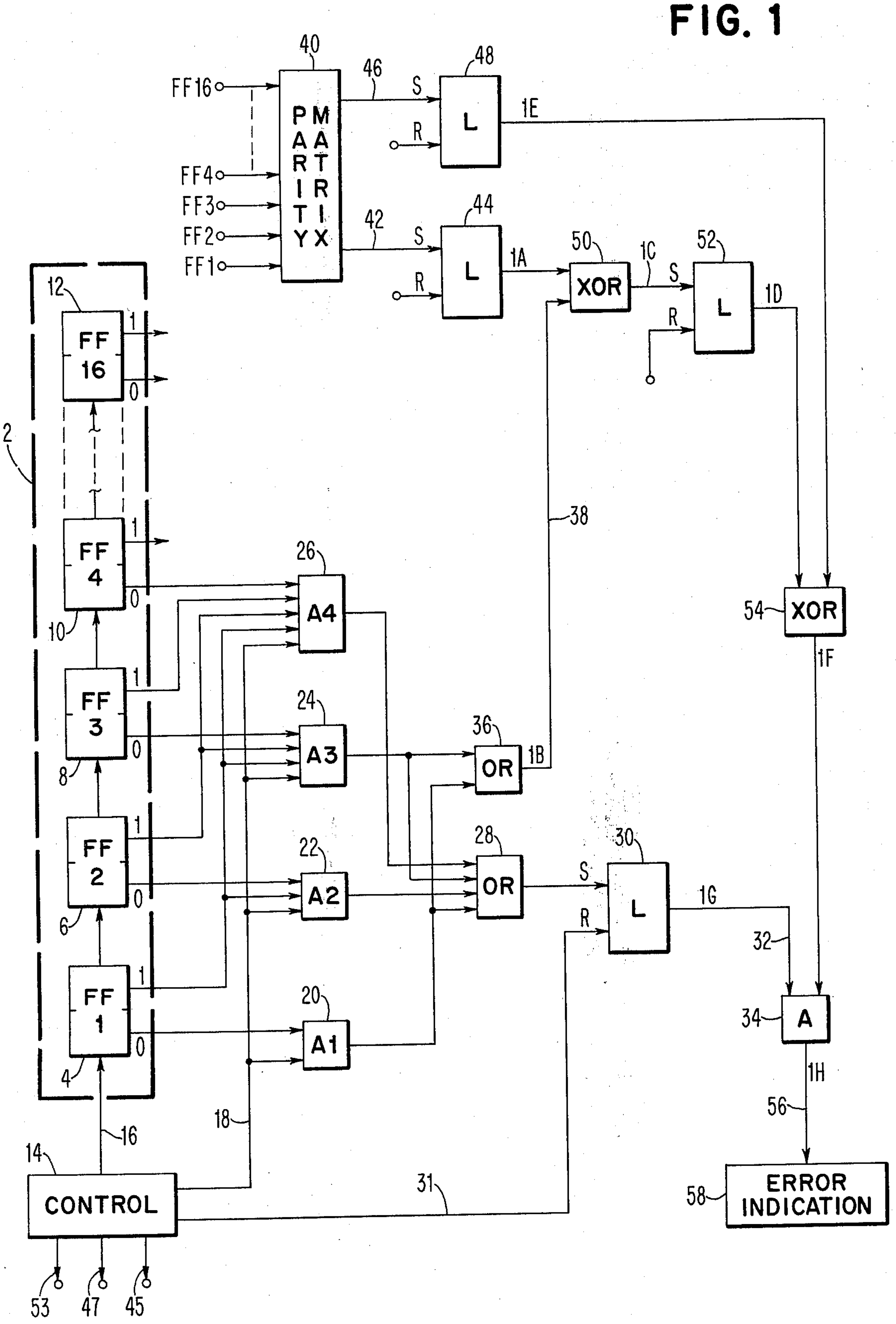
FIG. 1 is a block diagram representation of a parity prediction and checking network according to the present invention.

The present invention is directed to a method and apparatus for predicting and checking parity, wherein a single digit is applied to a given bit position in a multi-digit word. The invention is described wherein the multi-digit word is stored in an instruction counter or register, but it is to be appreciated that the invention is also applicable to an adder which has a single bit added thereto, or a memory which has a single bit applied thereto. In the description that follows whenever the term ONE is used, it is meant to describe a signal which is indicative of a binary one condition, and wherever the term ZERO is used, it is meant to describe a signal which is indicative of a binary zero condition. As is known in the art, the binary one condition may be represented by the presence of a pulse, and the binary zero condition may be represented by the absence of a pulse or vice versa. The term parity is used in the generic sense and refers to the parity bit or parity signal. The designations 1A–1H found on FIG. 1 are the circuit points at which the logical conditions set forth in the table of FIG. 4, are manifested in the circuit of FIG. 1.

A register, such as an instruction counter 2, is comprised of a plurality of bistable devices such as flip-flops 4–12. The N stage counter 2 is illustrated as having 16 stages (FF1–FF16), but it is to be appreciated that a greater or lesser amount of stages may be utilized in the practice of the invention. A controller or processor such as the control unit 14 applies a ONE to a given one of the N stages, for example the first flip-flop stage 4 via a line 16 for incrementing the counter by one. It is to be appreciated that the ONE may be applied to any given one of the 16 stages of the flip-flop for incrementing or decrementing thereof. In practice, if the instruction counter 2 is used for a 2 byte word, the ONE would be applied to the second stage 6 of the counter. A sample pulse is applied via a line 18 from a control unit 14 to a plurality of predict gates, such as the AND gates 20–26, for sampling the first through a Kth stage of the counter prior to the ONE being applied to the first stage 4 of the counter. For a 2 byte word, sampling by predict gates would again begin with the stage to which the ONE is applied, in this instance the second stage 6. In the embodiment set forth K is equal to 4, but it is to be appreciated that a greater or lesser number of stages of the counter may be sampled in the practice of the invention.

FIG. 2 is a table which sets forth the percent prediction time for a complete counter cycle, which percent is determined by the number of stages of the counter which are sampled. The reliability and prediction equation used for determining the percent prediction is $$1-(1-P)^K$$

where P is the probability, which is 0.5 for a bistable device, that is the device will be in the ONE stage 50% of the time and will be in the ZERO state 50% of the time, and where K equals the number of stages sampled.

Row 3A of the table shows that if one stage of the counter is sampled the parity may be predicted and checked 50% of the time as set forth in the right-most column of the table. Row 3G illustrates that the percent prediction in checking for a complete cycle is 0.9921875 if 7 stages are sampled. The percent predictability and checking time for the network set forth in FIG. 1 is shown in row 3D of the table of FIG. 2 and is a 0.9375 percentage figure where K equals 4.

The gates 20–26 each have their output connected to respective inputs of an OR network 28. The gate 28 applies a ONE to the set terminal of a latch such as a set-reset flip-flop 30 for providing a check parity signal on a line 32 whenever there is a ONE provided at the output of one of the gates 20–26. The latch 30 has a reset pulse applied thereto via a line 31 prior to the provision of the sample pulse. The check parity signal, which is a ONE, is applied to the first input of an AND gate 34. The functioning of the previously named gates will be explained in more detail shortly. The outputs of the gates 20 and 24 are also applied to respective inputs of an OR gate 36 which provides a change parity signal indication, which is a ONE, on a line 38 whenever a ONE is provided at the output of the gate 20 or 24. The gates 20–24 sample the first through Kth-1 stages of the counter. How the above named signals are derived will be explained in more detail shortly.

A standard parity matrix 40 which for example may be an exclusive OR tree, has its inputs connected to the respective outputs of the counter for determining the parity of the counter. A parity signal is applied via a line 42 to the set terminal of a latch 44 for indicating the parity of the counter prior to a ONE being applied to the counter. A parity signal is applied via a line 46 to the set terminal of a latch 48 for indicating the parity of the counter after the ONE has been added to the counter. Reset pulses are applied to latches 44 and 48 from terminals 45 and 47 of control unit 14 for resetting the latches at a time intermediate the provision of sample pulses. In practice only one latch would be used and would be reset at proper time intervals, however two latches are illustrated for clarity in the description of the invention.

The change parity signal present on line 38 is applied to a first input of a comparator such as the exclusive OR gate 50, and the parity signal manifested prior to the ONE being applied to the counter 2, is applied to a second input of the gate 50. Whenever the two input signals are the same, there is a ZERO manifested at the output of the gate 50, and conversely whenever the two inputs applied to the gate are not the same, a ONE is manifested at the output of the gate 50. The signal appearing at the output of the gate 50 is applied to the set terminal of a latch 52. A reset pulse is applied to the reset terminal of latch 52 from terminal 53 of control unit 14 just prior to the sample pulse being provided. The signal appearing at the output of the latch 52 is the predicted parity, and is applied to a first input of a comparator such as the exclusive OR gate 54. Applied to the second input of the gate 54 from the output of latch 48 is the parity signal which is manifested after the ONE is applied to the counter 2. Whenever the two inputs to the gate 54 are the same, a ZERO is manifested at the output which is indicative that the parity is correct. Conversely, if the input signals are not the same, a ONE is manifested at the output which ONE is termed an error signal, which is applied to the second input of the AND gate 34. It is seen that whenever the error signal is provided during the time the check parity signal is stored in the latch 30 that a ONE is applied from the output of gate 34 via a line 56 to an error indication device 58 for indicating an error in parity during the check parity time.

Refer now to FIG. 3 which is a truth table for the counter 2; which indicates the parity for the counter; the predict gate used for a given count condition; and an indication of whether the parity will change prior to a ONE being applied to the first stage of the counter. The predict gates 20, 22, 24 and 26 are termed A1, A2, A3 and A4 in the truth table. Row 2A illustrates the initial count condition of the counter, wherein the first four stages of the flip-flop all are in the ZERO state. If the ONES in the high order, that is stages 5–16 are even, the parity will be a ONE, and conversely if the ONES in the high order stages are odd the parity will be ZERO. The predict gate which is enabled at this time is gate A1, and accordingly parity will be checked since a ONE from gate 28 sets latch 30. For the binary condition set forth, the response to the question should the parity be changed is YES. That the parity should be changed may be seen with reference to row 2B which shows the binary condition of the counter after the ONE has been applied thereto. It is seen that if the ONES in the high order are even the parity changes from a ONE to a ZERO, and conversely if the ONES in the high order are odd the parity changes from a ZERO to a ONE.

For the count condition set forth in row 2B the predict gate A2 is enabled and a check parity signal is provided. The parity is not changed prior to the ONE being applied to the counter, since the parity conditions for row 2B and 2C are the same. For the count condition set forth in row 2C the predict gate A1 is once again enabled and the parity is changed prior to the ONE being applied to the counter. This is the same condition as set forth in row 2A. For the count condition set forth in row 2D the predict gate A3 is enabled and the parity is to be changed prior to the ONE being applied to the counter.

The count conditions set forth for rows 2E–2G are similar to those set forth above and therefore will not be described. With reference to row 2H it is seen that a new predict gate A4 is operative and that the parity is not changed prior to the ONE being applied. The new predict gate A4 is needed since the binary count 0 1 1 1 cannot be sensed by the gates A1, A2 or A3. The parity does not change at this time prior to the ONE being added as may be seen with reference to row 2I. For the count conditions illustrated by rows 2I–2P it is seen that one of the gates A1–A3 are operative and the logic therefore functions as previously explained. Row 2R illustrates the maximum count condition of the first four stages of the counter. This is the one time that parity is not checked since there are no predict gates responsive to this maximum count condition. Therefore, there is no output from the gate 28, the latch 30 is in the ZERO stage, there is no check parity signal provided and accordingly the gate 34 is disabled and no error indication may be provided. It is seen, therefore, that for 15 out of the 16 possible count conditions for the first four stages of the counter, the parity is checked.

Refer now to FIG. 4 which is a truth table which illustrates the possible binary conditions for the checking and the prediction of parity. As was stated previously, the designations 1A–1H found on FIG. 1 are the circuit points at which the logical conditions set forth in columns 1A–1H of FIG. 4 are manifested in the circuit of FIG. 1. With reference to row 4A it is seen that the parity prior to the ONE being added, as manifested at the output of the latch 44, (see 1A) is ZERO and that the change parity signal (see 1B), a ONE, is manifested at the output of the gate 36. In response thereto, the gate 50 (see 1C) provides a ONE at its output setting the latch 52 (see 1D) which indicates that the predicted parity is ONE. This signal is then compared with the parity after the ONE has been added (see 1E), which parity is a ONE. Therefore, the exclusive OR gate 54 (see 1F) provides a ZERO at its output since both of the input signals applied thereto are the same. The gate 34 therefore is disabled. The check parity signal as manifested at the output of the latch 30 (see 1G) is a ONE, however there is no error indication set forth by the device 58 since there is a ZERO output from the gate 34 (see 1H). The parity is therefore found to be correct.

Row 4B illustrates the condition where the parity prior to the ONE being added is a ZERO as manifested at the output of the latch 44, and that the parity is not to be changed as is manifested by a ZERO being provided at the output of the gate 36. Therefore a ZERO is provided at the output of the gate 50 and accordingly the latch 52 remains in the ZERO state, resulting in a predicted parity of ZERO. This ZERO is applied to the first input of the exclusive OR gate 54 which has applied to the second input thereof the parity of ZERO which is manifested after the ONE has been applied. Therefore, a ZERO is manifested at the output of the gate 54 and since the AND gate has a ONE applied to the other input thereof from the latch 30, a ZERO is provided at the output of the gate 34 and there is no error indication manifested by the device 58, which indicates that the parity is correct.

Row 4C illustrates the error indication when the parity is checked and found to be incorrect. The parity is a ONE prior to a ONE being applied to the counter and that the parity is to be changed. Therefore, a ONE is manifested at the output of the latch 44, and a ONE is manifested at the output of the gate 36. Therefore, a ZERO is applied to the latch 52 by way of the gate 50 and the predicted parity is ZERO. The actual parity after the ONE has been added is a ONE manifested ONE as the output of the latch 48. Therefore, a ONE is provided at the output of the gate 54 which is indicative of an error signal. Since a ONE is present at the output of the latch 30, which is indicative that the parity should be checked, a ONE is provided at the output of the gate 34 and an error indication is manifested by the device 58, which is indicative of an error in parity.

Row 4D illustrates a situation where there may be an error in parity when there is a maximum count in the lower four stages of the counter, which error cannot be detected since the check parity signal is a ZERO. The parity prior to the ONE being added is a ONE and the change parity signal is a ZERO, since the output from gates A1 and A3 are ZERO. Therefore, a ONE is provided at the output of the gate 50 setting the latch 52 to the ONE state, predicting the parity to be a ONE. The parity after the ONE has been added is a ZERO as manifested at the output of the latch 48 and in response thereto a ONE error signal is provided at the output of the gate 54. The check parity latch 30, however, is in the ZERO state, applying a ZERO signal to the other input terminal of the gate 34, resulting in no error indication being manifested by the device 58.

It is seen that for 15 of the 16 possible count conditions of the lower four stages of the counter that parity is checked and predicted. Therefore, the described checking and prediction circuit saves a significant amount of computer space and cost. The greatest savings results when there are counters with 16, 32, 64 or more stages, since only the low order stages may be sampled to predict and check the parity for a high percentage of the counter cycle time.

What is claimed is:

1. In a parity checking circuit the combination comprising:

an N stage register;

a parity generation circuit responsive to the binary state of said register for providing a parity signal;

means for storing a check parity signal indicative of the time period within which the parity of said register may be checked, prior to a ONE being applied to a given one of the N stages of said register, in response to sampling said given one of the N stages through a Kth stage of said register, where $K < N$;

means for providing a predicted parity signal in response to comparing said parity signal, prior to said ONE being applied to said given one of the N stages, with a change parity signal provided in response to sampling at least certain ones of said given one of the N stages through said Kth stage;

means for comparing said parity signal and said predicted parity signal for providing an error signal whenever there is a lack of comparison; and means for comparing said error signal with the stored check parity signal for indicating an error in parity in response to said error signal being provided concurrent with said check parity signal being stored.

2. In a parity checking circuit, the combination comprising:

an N stage register, a parity generation circuit responsive to the binary condition of said register for providing a parity signal;

means for storing a check parity signal indicative of the time period within which the parity of said register may be checked, prior to a ONE being applied to a given one of the N stages, in response to sampling said given one of the N stages through a Kth stage of said register, where K < N;

means for providing a first signal indicative that the parity of said register will change, prior to said ONE being applied to said given one of the N stages, in response to sampling said given one of the N stages through the Kth - 1 stage of said register;

means for comparing said first signal with said parity signal as manifested prior to said ONE being applied to said given one of the N stages for providing a predicted parity signal;

means for comparing said parity signal, as manifested after said ONE has been applied to said given one of the stages, with said predicted parity signal for providing an error signal; and means for comparing said error signal with the stored check parity signal for indicating an error in parity in response to said control signal being provided concurrent with said check parity signal being stored.

3. In a parity checking circuit, the combination comprising:

an N stage counter;

a matrix connected to the N stages of said counter for providing a parity signal indicative of the count condition of said counter;

means for storing a check parity signal indicative of the time period within which the parity of said counter may be checked, prior to a ONE being applied to the first stage of said counter, in response to sampling the first through a Kth stage of said counter, where K < N;

means for providing a first signal for indicating that the parity should be changed, prior to said ONE being applied to said first stage of said counter, in response to sampling the first through the Kth - 1 stage of said counter;

means for comparing said first signal with said parity signal, as manifested prior to said ONE being applied to said first stage of said counter for providing a predicted parity signal, including means for storing said predicted parity signal;

means for comparing the stored predicted parity signal with said parity signal, as manifested after said ONE has been applied to said first stage of said counter, for providing an error signal; and means for comparing said error signal with the stored check parity signal for indicating an error in parity in response to said error signal being provided concurrent with said check parity signal being stored.

4. In a parity circuit, the combination comprising:

an N stage instruction counter;

a parity matrix operative with the N stages of said counter for providing a parity signal indicative of the binary state of said counter;

means for providing a first signal in response to detecting a ZERO output from the first stage of said instruction counter, prior to a ONE being applied to the first stage of said counter;

means for providing a second signal in response to detecting a ONE and a ZERO output from the first and second stages, respectively, of said instruction counter, prior to said ONE being applied to said first stage of said counter;

means for storing a third signal indicative of the time period within which said parity may be checked, in response to the provision of one of said first and second signals;

means for providing a fourth signal, the provision of which is indicative that the parity should be changed, in response to the provision of said first signal;

means for comparing said fourth signal with said parity signal as manifested prior to said ONE being applied to said first stage of said counter for providing a predicted parity signal, including means for storing said predicted parity signal as a fifth signal;

means for comparing said fifth signal with said parity signal, as manifested after said ONE has been added to said given one of the N stages of said counter, for providing an error signal whenever there is a lack of comparison; and means for comparing said error signal with the stored check parity signal for indicating an error in parity in response to said error signal being provided concurrent with said check parity signal being stored.

5. The combination claimed in claim 4, including:

means for providing a sixth signal in response to detecting a ONE, a ONE, and a ZERO output from the first, second and third stages, respectively, of said instruction counter, prior to said ONE being applied to said first stage of said instruction counter, with said third signal also being stored and said fourth signal also being provided in response to the provision of said sixth signal.

6. The combination claimed in claim 5, including:

means for providing a seventh signal in response to detecting a ONE, a ONE, a ONE and a ZERO output from the first, second, third and fourth stages, respectively, of said instruction counter, prior to said ONE being applied to said first stage of said instruction counter, with said third signal also being stored in response to the provision of said seventh signal.

7. In a parity checking circuit, the combination comprising:

an N stage instruction counter;

a matrix connected to the N stages of said instruction counter for providing a parity signal indicative of the binary count condition of said instruction counter;

means for providing a first signal in response to detecting a ZERO output from the first stage of said instruction counter, prior to a ONE being applied to the first stage of said counter;

means for providing a second signal in response to detecting a ONE and a ZERO output from the first and second stages, respectively, of said instruction counter, prior to said ONE being applied to said first stage;

means for providing a third signal in response to detecting a ONE, a ONE, and a ZERO output from the first, second and third stages, respectively, of said instruction counter, prior to said ONE being applied to said first stage of said counter;

means for storing a fourth signal indicative of the time period within which said parity may be checked, in response to the provision of one of said first, second and third signals;

means for providing a fifth signal indicative that the parity should be changed in response to the provision of one of said first and third signals;

means for comparing said fifth signal with said parity signal as manifested prior to said ONE being applied to said first stage of said counter for providing a predicted parity signal, including means for storing said predicted parity signal as a sixth signal;

means for comparing said sixth signal with said parity signal, as manifested after said ONE has been applied to said given one of said N stages, for providing an error signal whenever there is a lack of comparison; and means for comparing said error signal with said fourth signal for indicating an error in parity in response to said error signal being provided concurrent with said fourth signal being stored.

8. A method of checking the parity of an N bit word, said method comprising the steps of:

providing a parity signal in response to sensing all of the N bits of said word;

storing a check parity signal for a predetermined duration of time indicative of the time the parity of said word may be checked, prior to a ONE being applied to a given one of the bit positions of said word, in response to sampling said given one of the bit positions through a Kth bit position of said word, where $K < N$;

providing a predicted parity signal, prior to said ONE being applied to said given one of said bit positions, in response to sampling at least certain ones of said given one of the bit positions through said Kth bit position; and indicating an error in parity whenever there is a lack of comparison between said parity signal and said predicted parity signal during the time said check parity signal is provided.

9. The method of claim 8, wherein the last-named step includes the steps of:

providing an error signal in response to comparing said predicted parity signal with said parity signal, as manifested after said ONE has been applied to said given one of the N bit positions of said word; and indicating said error in parity whenever said error signal is provided during the time said check parity signal is provided.

* * * * *